United States Patent
Franzen et al.

(10) Patent No.: US 8,651,793 B2
(45) Date of Patent: Feb. 18, 2014

(54) METHOD AND SYSTEM FOR TRANSFERRING STANDARD CARGO HOLDERS, ESPECIALLY ISO CONTAINERS AND SWAP BODIES, BETWEEN RAILWAYS AND ROADS

(75) Inventors: Hermann Franzen, Monchengladbach (DE); Armin Wieschemann, Oberhausen (DE); Mike Hegewald, Oberhausen (DE); Jannis Moutsokapas, Monheim (DE)

(73) Assignee: Gottwald Port Technology, GmbH, Duesseldorf (DE)

( * ) Notice: Subject to any disclaimer, the term of this patent is extended or adjusted under 35 U.S.C. 154(b) by 0 days.

(21) Appl. No.: 13/133,616

(22) PCT Filed: Nov. 30, 2009

(86) PCT No.: PCT/EP2009/066085
§ 371 (c)(1),
(2), (4) Date: Jun. 8, 2011

(87) PCT Pub. No.: WO2010/066602
PCT Pub. Date: Jun. 17, 2010

(65) Prior Publication Data
US 2011/0243704 A1    Oct. 6, 2011

(30) Foreign Application Priority Data
Dec. 9, 2008 (DE) .......................... 10 2008 061 198

(51) Int. Cl.
*B65G 63/00* (2006.01)
(52) U.S. Cl.
USPC ........... 414/342; 212/319; 414/344; 414/392; 414/561

(58) Field of Classification Search
USPC ........... 414/140.3, 141.3, 340, 342, 344, 391, 414/392, 561; 212/319
See application file for complete search history.

(56) References Cited

U.S. PATENT DOCUMENTS

| | | | | |
|---|---|---|---|---|
| 909,804 | A * | 1/1909 | Kendall | 414/591 |
| 1,900,867 | A * | 3/1933 | Olds | 414/803 |

(Continued)

FOREIGN PATENT DOCUMENTS

| | | |
|---|---|---|
| DE | 19503199 | 2/1996 |
| DE | 19740557 | 5/1998 |

(Continued)

OTHER PUBLICATIONS

German Examination Report on DE 102008061198.022 dated Jul. 27, 2009, which corresponds to the current application.

(Continued)

*Primary Examiner* — James Keenan
(74) *Attorney, Agent, or Firm* — Gardner, Linn, Burkhart & Flory, LLP

(57) ABSTRACT

Method and system for transferring standard cargo holders, especially ISO containers and swap bodies, between railways and roads. The standard cargo holders are loaded onto driverless transport vehicles by means of handling equipment or are received by said transport vehicles, and the driverless transport vehicles transport the standard cargo holders between the handling equipment and a loading and unloading zone. Alternatively, a driving zone for driverless transport vehicles for transporting standard cargo holders to or from the handling equipment adjoins the handling equipment, and a loading and unloading zone for transporting standard cargo holders adjoins the driving zone.

13 Claims, 7 Drawing Sheets

(56) References Cited

U.S. PATENT DOCUMENTS

| | | | |
|---|---|---|---|
| 3,559,822 A * | 2/1971 | Lichtenford et al. | 414/140.3 |
| 3,891,100 A * | 6/1975 | Tamaki et al. | 414/342 |
| 4,496,063 A * | 1/1985 | Ishii et al. | 212/270 |
| 5,421,688 A * | 6/1995 | Fuchtey et al. | 414/392 |
| 5,445,282 A * | 8/1995 | Erikkila | 212/312 |
| 5,857,821 A * | 1/1999 | Wiedeck | 414/334 |
| 6,030,168 A | 2/2000 | Kroll et al. | |
| 6,190,107 B1 * | 2/2001 | Lanigan et al. | 414/342 |
| 6,698,990 B1 * | 3/2004 | Dobner et al. | 414/139.9 |
| 6,715,977 B2 | 4/2004 | Dobner | |
| 7,004,338 B2 | 2/2006 | Franzen et al. | |
| 7,686,558 B2 | 3/2010 | Tian et al. | |
| 8,517,192 B2 * | 8/2013 | Franzen et al. | 212/319 |
| 2010/0021272 A1 | 1/2010 | Ward | |
| 2011/0163058 A1 * | 7/2011 | Franzen et al. | 212/319 |

FOREIGN PATENT DOCUMENTS

| | | | |
|---|---|---|---|
| DE | 10251910 | 6/2004 | |
| DE | 20321477 | 8/2007 | |
| EP | 0302569 | 2/1989 | |
| EP | 0796813 | 9/1997 | |
| EP | 1178942 | 5/2000 | |
| EP | 1365984 | 1/2001 | |
| EP | 1293469 | 3/2003 | |
| EP | 1847492 | 10/2007 | |
| FR | 2785273 | 5/2000 | |
| GB | 2 065 076 A * | 6/1981 | B65G 63/00 |
| JP | 4243709 | 8/1992 | |
| WO | 9609242 | 3/1996 | |
| WO | 2010026076 | 3/2010 | |

OTHER PUBLICATIONS

International Search Report and Written Opinion of the International Search Authority from corresponding Patent Cooperation Treaty (PCT) Application No. PCT/EP2009/066085, mailed Mar. Jan. 4, 2010.

International Preliminary Examination Report (IPER) of the International Searching Authority from corresponding PCT Application No. PCT/EP2009/066085, mailed Mar. 24, 2011.

English translation of International Search Report of the International Search Authority from corresponding Patent Cooperation Treaty (PCT) Application No. PCT/EP2009/066085, mailed Mar. Jan. 4, 2010.

International Preliminary Examination Report (IPER) for International Application No. PCT/EP2009/066085, which corresponds to the current application.

Substitute Specification, drawings, and Preliminary Amendment from co-pending U.S. Appl. No. 13/132,118, filed Jun. 1, 2011.

Substitute Specification, drawings, and Preliminary Amendment from co-pending U.S. Appl. No. 13/133,532, filed Jun. 8, 2011.

Substitute Specification, drawings, and Preliminary Amendment from co-pending U.S. Appl. No. 13/133,459, filed Jun. 8, 2011.

Original claims in International Application No. PCT/EP2009/066085 showing handwritten amendments made under PCT Article 34.

* cited by examiner

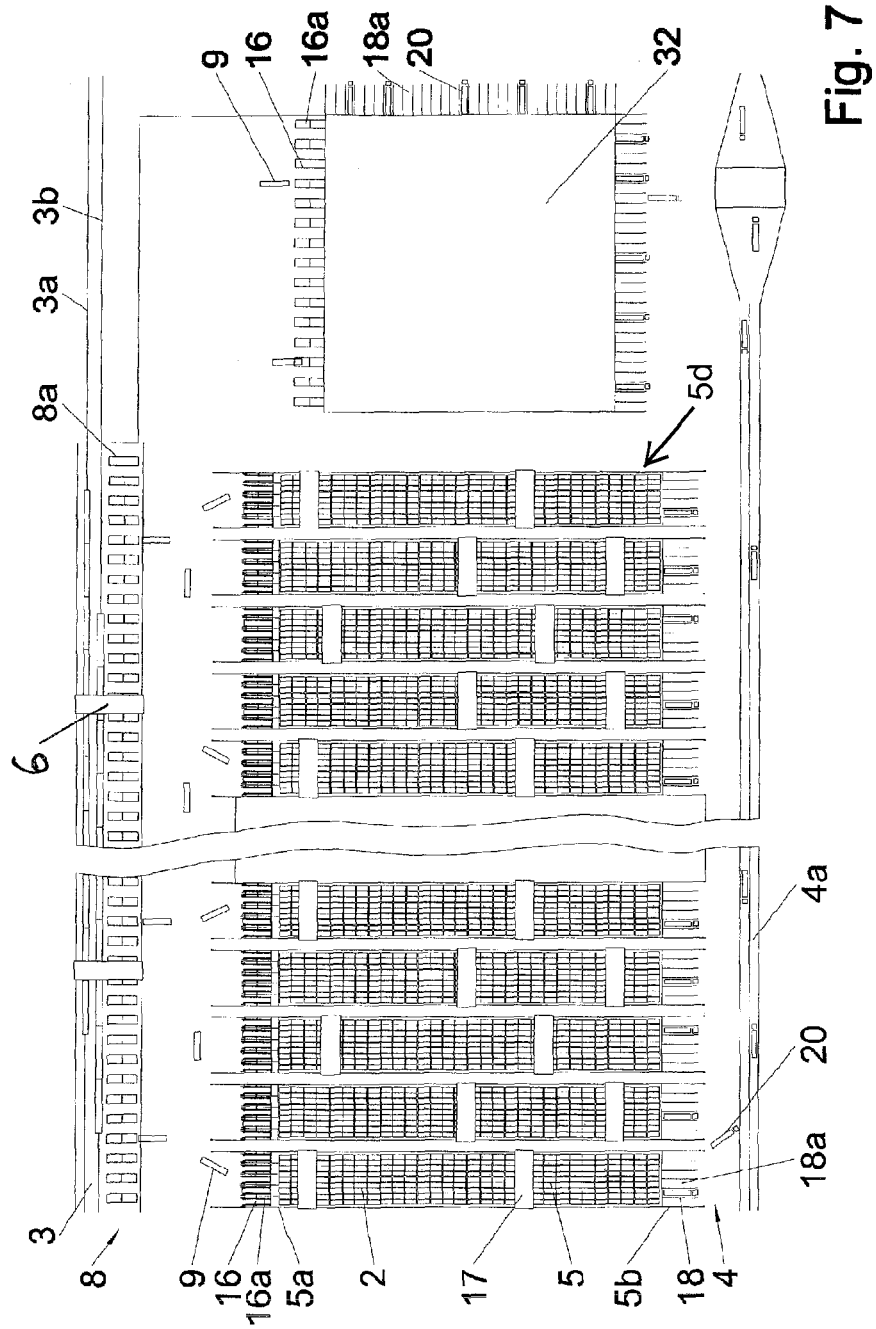

METHOD AND SYSTEM FOR TRANSFERRING STANDARD CARGO HOLDERS, ESPECIALLY ISO CONTAINERS AND SWAP BODIES, BETWEEN RAILWAYS AND ROADS

FIELD OF THE INVENTION

The invention relates to a method and system for transferring standard cargo holders, especially ISO containers and swap bodies in a rail handling zone between road and railway.

BACKGROUND OF THE INVENTION

A gantry crane for transferring containers and swap bodies between railways and roads is disclosed in European patent EP 0 796 813 B1. Corresponding to the design customary for a gantry crane, a crane trolley on a crane girder, which can travel in the girder's longitudinal direction, is provided. Seen in travel direction of the gantry crane, two hydraulic cylinder units are attached in tandem and with spacing between them. Each of the cylinder units is vertically oriented and includes a lift cylinder and in it a movable push rod. The lift cylinders are rigidly attached to the crane trolley and the push rods, extending downwards from the crane trolley, can be extended in the lowering direction and correspondingly retracted in the lifting direction. At the ends of the push rods opposed to the crane trolley, a suspension frame is attached via slotted hole connections, on which a load take-up device in the shape of a spreader frame is suspended. The connection of the suspension frame with the push rods via slotted hole connections was selected in order to balance differences in the synchronous operation of the cylinder units and corresponding inclinations of the containers. In addition, the suspension frame and the load take-up device arranged in it is offset laterally in regard to the longitudinal axis of both rod-cylinder units by at least 500 mm so that containers or swap bodies can also be placed on a rail car, or lifted off it and simultaneously a catenary wire can reach under the laterally offset arrangement of the load take-up device at the push rod.

Additionally, European patent EP 1 365 984 B1 discloses a bridge crane for stacking containers, in particular ISO containers, which moves containers within a container terminal into or out of a storage site. The bridge crane contains a crane girder which spans the width of an generally rectangular storage site. On the crane girder and along its longitudinal direction, a crane trolley can be moved in the direction of the width of the storage site. The crane girder can be moved via bridge trolleys on tracks in the direction of the crane travel and, thus, laterally to the crane trolley on the crane girder as well as in longitudinal direction of the storage site. In order to be able to handle the container, a mast is positioned on the crane trolley which is guided in vertical direction and can be lifted or lowered. This mast is shaped like a box girder and lifting gears are placed on the crane trolley for the lifting and lowering movement of the mast. On the lower end of the mast pointing in the direction of the containers to be handled is a load take-up device for containers, in particular a so-called spreader, suspended in an articulated fashion. The load take-up device is connected via cables to the lifting gears on the crane trolley. The mast is not directly driven in the lifting or lowering direction, but only indirectly via the cables acting at the load take-up device. The use of a rigid mast between the crane trolley and the load take-up device has the advantage that containers can be handled with little swaying movement in contrast to the also-used load take-up devices which are exclusively suspended on cables.

SUMMARY OF THE INVENTION

The present invention provides an improved method and system for transferring standard cargo holders, especially ISO containers and swap bodies, between railways and roads.

According to one aspect of the invention, a method is provided for transferring standard cargo holders, especially ISO containers and swap bodies, between rail and road, in which the standard cargo holders are loaded onto or off rail cars by means of handling equipment adjacent to a railway track in a rail transfer zone. Improvement to the transfer process is achieved by the standard cargo holders being loaded onto or picked up off driverless transport vehicles by means of handling equipment and the standard cargo holders being transported by the driverless transport vehicles between the handling equipment and a loading and unloading zone. By using the driverless transport vehicles, the road and rail transfer zones are separated, the result of which is that rail cars can be loaded or unloaded faster, as no logistic coordination between the rail car and the allocated truck is required.

A further disentanglement or organization of the arrival times of the rail cars and the associated trucks is achieved by loading or unloading the standard cargo holders in the loading and unloading zone onto or off of the driverless transport vehicles by means of a stacking device, and transporting the standard cargo holders with the stacking device between the driverless transport vehicles and a cargo holder storage site. The utilization of a cargo holder storage site increases logistic flexibility.

Particularly advantageous is that the standard cargo holders are loaded onto or unloaded off of trucks in a road transfer zone by the stacking device and that the standard cargo holders are transported by the stacking device between the loading and unloading zone and the storage site. Thus, the stacking device can be used for storage site tasks as well as for loading and unloading the trucks and the driverless transport vehicles.

A further increase in flexibility is achieved by the standard cargo holders in the loading and unloading zone being placed by the driverless transport vehicles, which are equipped with a lifting platform, onto a supporting frame. The driverless transport vehicles can thus be operated independently of the transfer and stacking devices.

Optionally, the standard cargo holders resting on the supporting frame are transported by additional driverless transport vehicles.

According to another aspect of the invention, the transfer is improved with a system for transferring standard cargo holders, especially ISO containers and swap bodies, between rail and road, with handling equipment for loading and unloading standard cargo holders onto or off of rail cars in a rail transfer zone adjacent to a railway track. A driving zone for driverless transport vehicles, bringing or picking up the standard cargo holders to or from the handling equipment, is adjacent to the handling equipment, and a loading and unloading zone for delivering or collecting the standard cargo holders is adjacent to the driving zone.

Optionally, a cargo holder storage site is provided with a stacking device for transporting the standard cargo holders between the loading and unloading zone and the storage site is adjacent to the loading and unloading zone. The cargo holder storage site allows an intermediate storage of the standard cargo holders.

Optionally, a road transfer zone for loading and unloading the standard cargo holders onto or off of trucks may adjoin the storage site. Thus, the cargo holder storage site is linked to both the rail and the road transfer zones.

To increase the flexibility and the transfer performance, the driverless transport vehicles may each be equipped with a lifting platform, and supporting frames are positioned in the loading and unloading zone for resting or picking up the standard cargo holders from the lifting platform of the driverless transport vehicles.

Optionally, the handling equipment and the stacking device may be formed like a bridge or gantry crane.

The orientation of the standard cargo holders can be adapted to the turnover flow by being able to rotate the standard cargo holder, which is being transported by the handling equipment and/or the stacking device, around a vertical axis.

The handling equipment and/or the stacking device may include a movable crane trolley along a crane girder in a trolley track direction, on which a rigid mast is guided, which is extending in lifting and lowering direction. The mast is movable in a lifting and lowering direction by means of cables via at least one lifting gear attached on the crane trolley, at the end of which a load take-up device for standard cargo holders is attached. In one embodiment, the mast can be rotated around a vertical pivot axis in relation to the crane trolley.

If the rail tracks should be equipped with catenary lines, the load take-up device of the handling equipment may be placed laterally offset from the mast.

Stable guidance of the standard cargo holders is achieved by a crane girder including a first girder and a second girder on which trolley tracks are located, on which the crane trolley can be moved in trolley track direction and in which the first girder and the second girder are spaced from each other in the crane traveling direction, which runs at a right angle to the trolley track direction.

These and other objects, advantages and features of this invention will become apparent upon review of the following specification in conjunction with the drawings.

BRIEF DESCRIPTION OF THE DRAWINGS

FIG. 7 is a top plan view of a transfer system for standard cargo holders, including the portion of FIG. 1.

DESCRIPTION OF THE PREFERRED EMBODIMENTS

Figure 1:
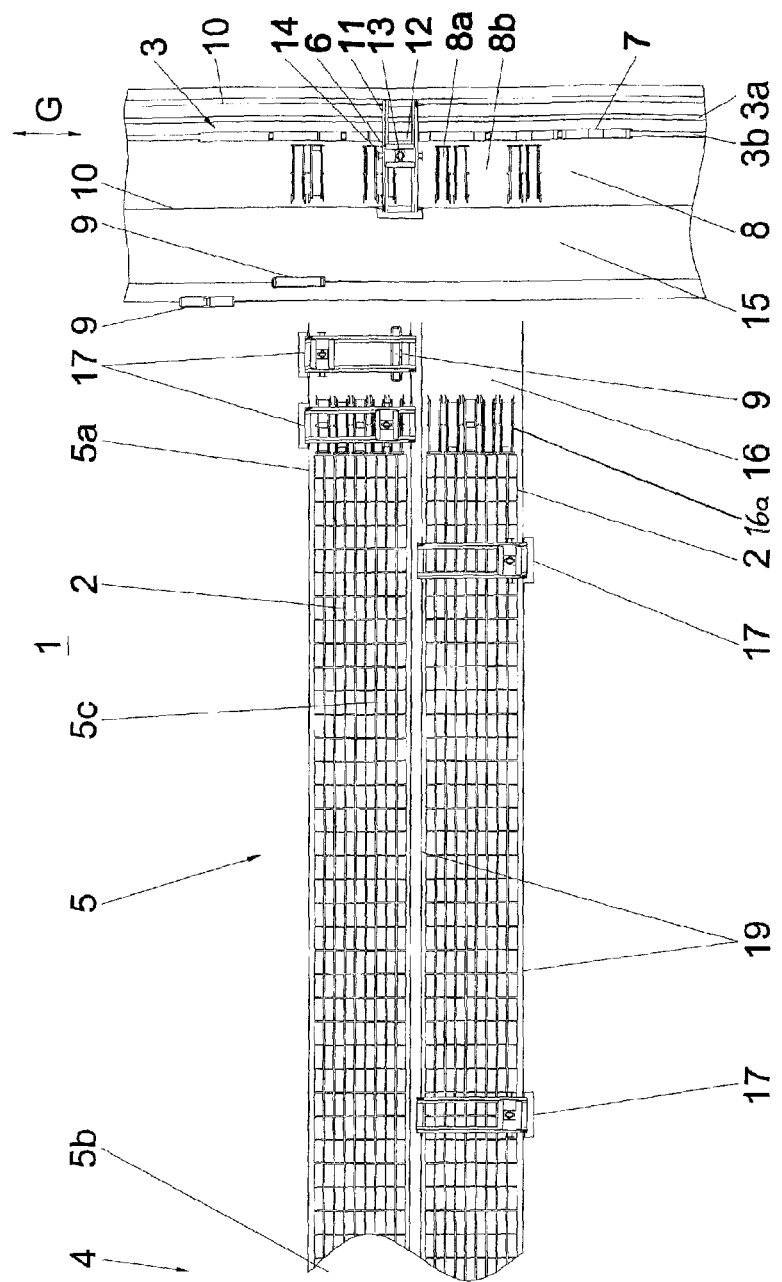
FIG. 1 is a top plan view of a portion of transfer system for standard cargo holders in accordance with the present invention.

FIG. 1 shows an overview plan of a transfer system 1 for standard cargo holders 2, such as ISO containers and swap bodies, which are transferred between a rail transfer zone 3 and a road transfer zone 4. The overview plan of FIG. 1 only shows a section of transfer system 1, but identifies the essential components. Transfer system 1 includes the rail transfer zone 3 and the road transfer zone 4 which are connected via a cargo holder storage site 5. The cargo holder storage site 5 serves as intermediate storage for the standard cargo holders 2.

The rail transfer zone 3 includes a first rail track 3a, a parallel and spaced second rail track 3b, and the allocated handling equipment 6. On the first and the second tracks 3a and 3b, rails cars 7 can be moved for inward and outward transport of the standard cargo holders 2. The handling equipment 6 is developed as a bridge or gantry crane which spans the first and the second tracks 3a and 3b as well as a transfer zone 8. In the transfer zone 8, driverless transport vehicles 9 can be driven in or out.

The driverless transport vehicles 9 are suited for transporting two twenty-foot containers, one forty-foot container or one forty-five-foot container. By means of the handling equipment 6, the standard cargo holders are transferred between the driverless transport vehicles 9, positioned in the transfer zone 8, and the rail cars 7.

The handling equipment 6, developed as a bridge or gantry crane, includes a crane girder 11, which can be moved along the first and second tracks 3a and 3b on the rails 10 in the track direction G. The rails 10 run parallel to the tracks 3a, 3b. On the crane girder 11, transverse to track direction G which coincides with the driving direction of the handling equipment 6, a crane trolley 12 can be moved in trolley track direction K. On the crane trolley 12, a mast 13 is suspended, which can be raised and lowered vertically and relative to the crane trolley 12, in order to pick up and release standard cargo holders 2 by means of a load take-up device 14 attached to its lower end 13a.

Depending on the arrangement or embodiment of the handling equipment 6, the orientation of the standard cargo holders 2 is maintained during transfer between the driverless transport vehicles 9 and the rail cars 7, or they are rotated around a vertical axis, if desired. In FIG. 1, the standard cargo holders 2 on the rail cars 7 are shown oriented in track direction G and the driverless transport vehicles 9 with their longitudinal axes rotated by 90 degrees in relation to them. Correspondingly, the handling equipment 6 has a rotating device 26 for this purpose.

The transfer zone 8 is positioned along the side of the second track 3b. In the case shown, this transfer zone 8 includes supporting the frames 8a, on which the standard cargo holders 2, unloaded from the rail cars 7, can be placed for interim storage or can be picked up from them by means of the handling equipment 6, and/or from the neighboring parking sites 8b on which the driverless transport vehicles 9 can wait for delivering the standard cargo holders 2 to (or picking them up from) the handling equipment 6. The driverless transport vehicles 9 are each equipped with a lifting platform 9a so that the driverless transport vehicles 9 with lowered lifting platform 9a can drive into the supporting frames 8a, and thus drive under a standard cargo holder 2 resting on them.

For picking up the standard cargo holder 2, the lifting platform 9a is then raised and the standard cargo holder 2 is lifted from the supporting frame 8a. The driverless transport vehicle 9 then drives with the raised lifting platform 9a and the standard cargo holder 2 resting on it out of the supporting frame 8a, then lowers the lifting platform 9a and continues its drive. Placing a standard cargo holder 2 on a supporting frame 8a is carried out in reverse order.

The transfer zone 8 is adjoined by a driving zone 15 in which the driverless transport vehicles 9 move in automated operation. Adjacent to this driving zone 15 and preferably opposite to the transfer zone 8, a loading and unloading zone 16 is located which forms the interface to the cargo holder storage site 5.

In this loading and unloading zone 16 supporting frames are again arranged in order to temporarily store the standard cargo holders 2 there for further handling. Sites for the driverless transport vehicles 9 can also be provided there, in order to transfer the standard cargo holders 2 directly with the driverless transport vehicles 9 without the supporting frames 16a. In the loading and unloading zone 16, the supporting frames 16a are loaded with or unloaded from the standard cargo holders 2 by means of a stacking device 17, which operates in the cargo holder storage site 5 and is in the form of a bridge or gantry crane.

The cargo holder storage site 5 includes a large number of cargo holder storage zones 5c, which are arranged in parallel side by side and in rows. At their rail-side end 5a each has a loading and unloading zone 16 and at their road-side end 5b is an associated storage and retrieval zone 18. Each cargo holder storage zone 5c is allocated one or several stacking devices 17 which can be moved along the cargo holder storage zones 5c on rails 19 in crane movement direction. The stacking device 17 transports the standard cargo holders 2 between the cargo holder storage zone 5c and the loading and unloading zone 16, or the storage and retrieval zone 18. Each cargo holder storage zone 5c, in addition to the one or more stacking devices 17, also has a parking zone 5d for the standard cargo holders 2. The parking zone 5d has a rectangular floor space on which the standard cargo holders 2 are arranged in columns and rows.

Up to five standard cargo holders 2 are stored stacked on top of each other. The parked standard cargo holders 2 are oriented with their long side generally parallel to the rails 19 and, thus, in crane travel direction of the stacking devices 17. This orientation of the standard cargo holders 2 can also be found in the loading and unloading zone 18 with the arriving and departing trucks 20, so that the stacking devices 17 do not have to rotate the standard cargo holders 2 during pick-up or deposit in addition to any required alignment corrections. In principle, it is also possible to equip the stacking device 17 with a rotating mechanism for changing the orientation of the standard cargo holders 2 in the horizontal plane. The design of the stacking device 17 generally corresponds to the design of the handling equipment 6.

At the rail-side end 5a of the cargo holder storage site 5, the standard cargo holders 2 are placed in the storage and retrieval zone 16 by the stacking device 17 onto the supporting frames 16a, or are retrieved from there. The storage and retrieval zone 16 serves as an interface to the rail transfer zone 3 and has several supporting frames 16a for the standard cargo holders 2, arranged side by side, into which the driverless transport vehicles 9 with their lifting platforms 9a can drive, in order to pick up the temporarily stored standard cargo holders 2 or park them there. It is also possible that the containers 2 are directly picked up by means of the stacking crane or stacking device 17 from its platform, or placed there. Then, no supporting frames 16a exist and the driverless transport vehicles 9 have no lifting tables or lifting platforms.

Figure 2:
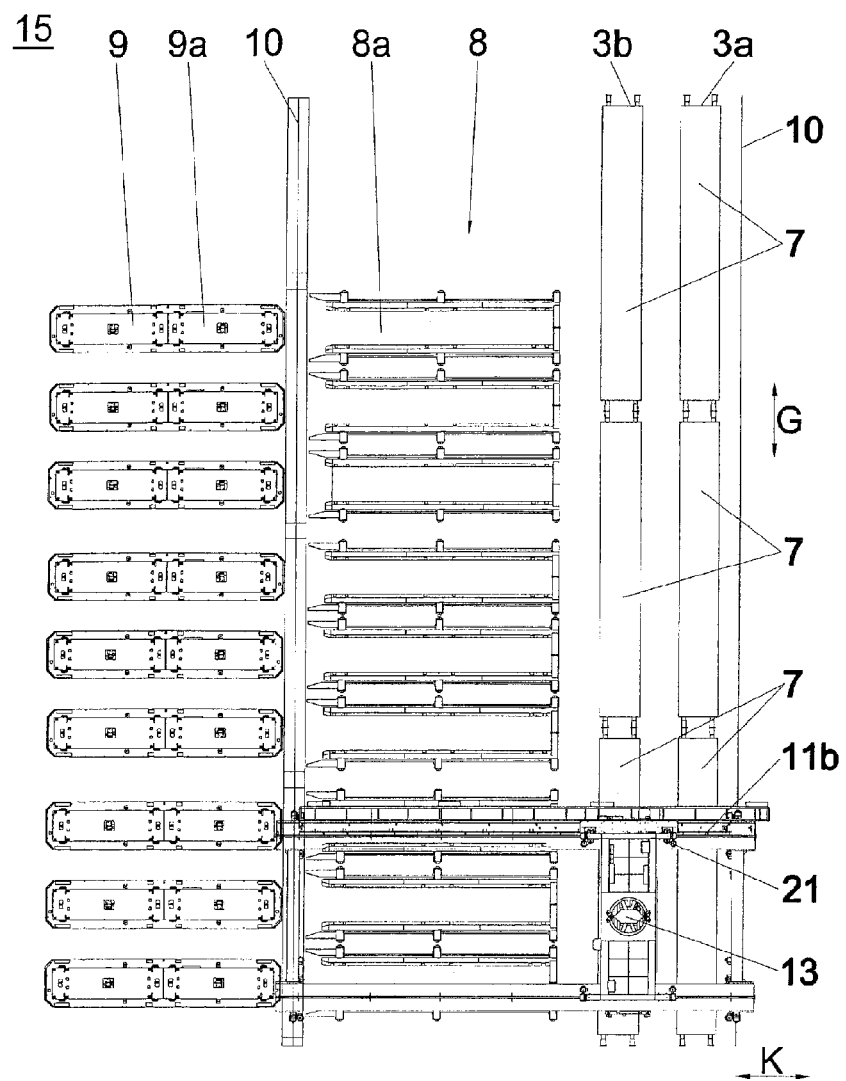
FIG. 2 is an enlarged sectional view of a portion of FIG. 1, taken from the area of a rail transfer zone.

In the sectional enlargement of FIG. 2, no parking sites 8b for the driverless transport vehicles 9 are shown between the supporting frames 8a. The handling equipment 6, in the form of a semi-gantry crane can be traversed along the rails 10 in track direction G. Corresponding to the semi-gantry crane construction, one of the two rails 10, namely the one rail 10 adjoining the first track 3a, is located on approximately the same height level as the tracks 3a, 3b. The opposing rail 10 is elevated so that the driverless transport vehicles 9 can drive without intersecting or contacting the supporting frames 8a and/or parking sites 8b.

The crane trolley 12 includes a rectangular base frame 12a, on the four corners of which the trolley travelling gears 21 are positioned, which travel on the trolley tracks on the crane girder 12. The base frame 12a of the crane trolley 12 has an opening in the center area through which a rotation tube 26 is passed through. The rotating tube 26 is supported on its top end via a revolving joint 26a on the base frame 12a of the crane trolley 12 and can be rotated via the revolving joint 26a around a vertical rotating axis. Mast 13 runs inside the rotating tube 26 and is guided there.

FIG. 2 also shows that the crane girder 11 is designed with a first girder 11a and a second girder 11b which, seen in rail direction G, are arranged in tandem at one height level and with spacing between them.

Figure 3:
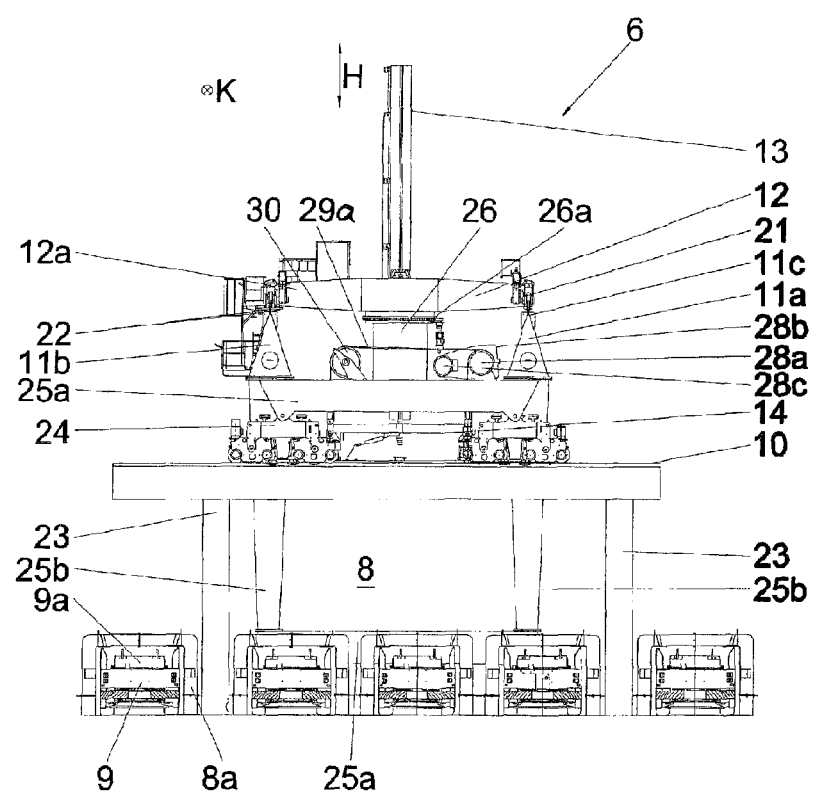
FIG. 3 is a side elevation of the portion of the transfer system FIG. 2.

As best seen in FIG. 3, the first girder 11a and the second girder 11b each have a triangular cross-section. This triangular cross-section has the shape of an isosceles triangle with the angle in the top area of 11c being about 30 degrees. The trolley rail 22 is mounted on each of the top areas 11c of the first girder 11a and the second girder 11b. The crane trolley 12 can be traversed on these rails in the trolley track direction K. In the front area, corresponding to the semi-gantry design, the rail 10 is elevated via the supports 23 and the base or base plates of the first girder 11a and the second girder 11b, which are connected by a base girder 25a and are directly supported via the crane travelling mechanism 24 on the rail 10. Also corresponding to the semi-gantry design, in the rear area, the ends of the first girder 11a and the second girder 11b are supported via two vertical girders 25b on the crane traversing mechanism 24. The lower ends of the two vertical girders 25b are connected in a U-shape via another base girder 25a.

FIG. 3 also shows the revolving joint 26a and the rotating tube 26. As a drive for the rotating tube 26, a ring gear running around its outside is provided which engages an electric motor rotary actuator. In order to move the mast 13 in the lifting and lowering direction H, a rectangular lifting frame 27 (FIG. 6) is rigidly mounted on the lower end of the rotating tube 26. A lifting gear 28 for the mast 13 is located on the lifting frame 27 of the crane trolley 12.

The lifting gear 28 has a first cable drum 28a and a second cable drum, which are co-axially bearing mounted on a common transmission, which is driven by a drive motor 28c. A first cable 29a and a second cable (not shown in FIG. 3) reel off the first cable drum 28a. A third cable and a fourth cable (also not shown in FIG. 3) reel off the second cable drum. Correspondingly, there are four cables 29 which either directly reel off vertically downwards from the first cable drum 28a or the second cable drum, or are guided horizontally to the opposite side of mast 13 and from there, via a corner pulley with a horizontal rotating axis, are diverted by 90 degrees vertically downwards. The ends of the cables 29 are connected with the load take-up device 14.

Figure 4:
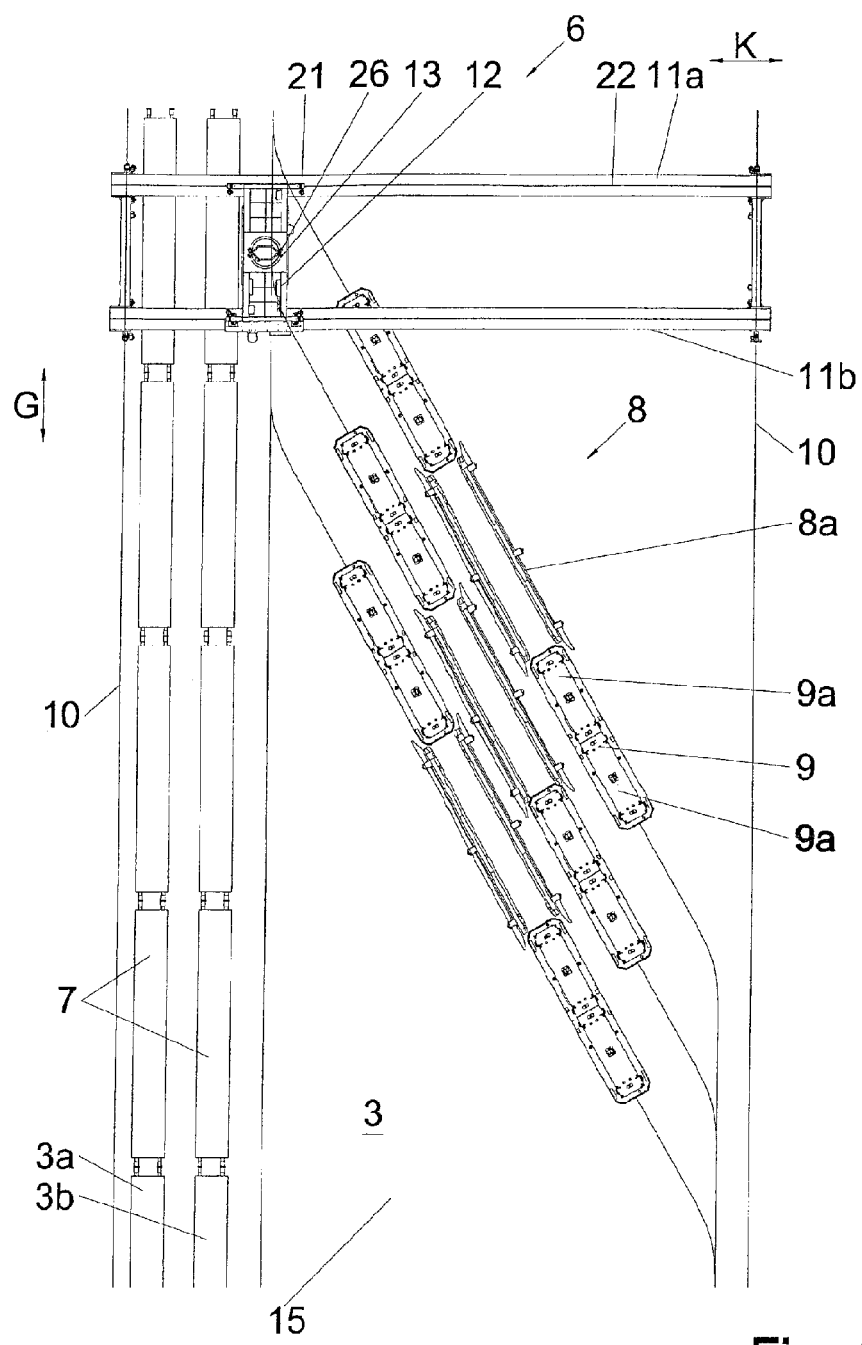
FIG. 4 is an enlarged sectional view of an alternative rail transfer zone similar to that of FIG. 2.

FIG. 4 shows a view of a rail transfer zone 3 in an alternative embodiment, which generally corresponds to the one shown in FIG. 2. Here also the first and second rail tracks 3a, 3b, running in parallel, can be seen with the rail cars 7, which can be moved on them, as well as the rails 10 for the handling equipment 6, running parallel to the direction of the tracks. Here, the handling equipment 6 is designed as a gantry crane, as the driverless transport vehicles 9 do not have to cross the rails 11 in order to drive in or out of the driving zone 15 between the tracks 3a, 3b and the rails 11. As explained before, the handling equipment 6 can be equipped with a rotating tube 26 and a revolving joint 26a and can, thus, rotate around a vertical axis in a horizontal plane the standard cargo holders lifted by the load take-up device 14. This facilitates placing the standard cargo holders 2, which are lifted from the rail cars 7, on the supporting frames 8a within the transfer zone 8, or retrieving them from these. The supporting frames 8a are approximately oriented with their long dimension in an angle of 30 degrees to the track direction G. Thus, the driverless transport vehicles 9 can drive into the supporting frames 8a from one side, then pick up the standard cargo holders 2, or put them down, and drive out on the opposite side, in order to then leave the driving zone 15 at the end of the handling equipment 6 and thus its rails 10.

Figure 5:
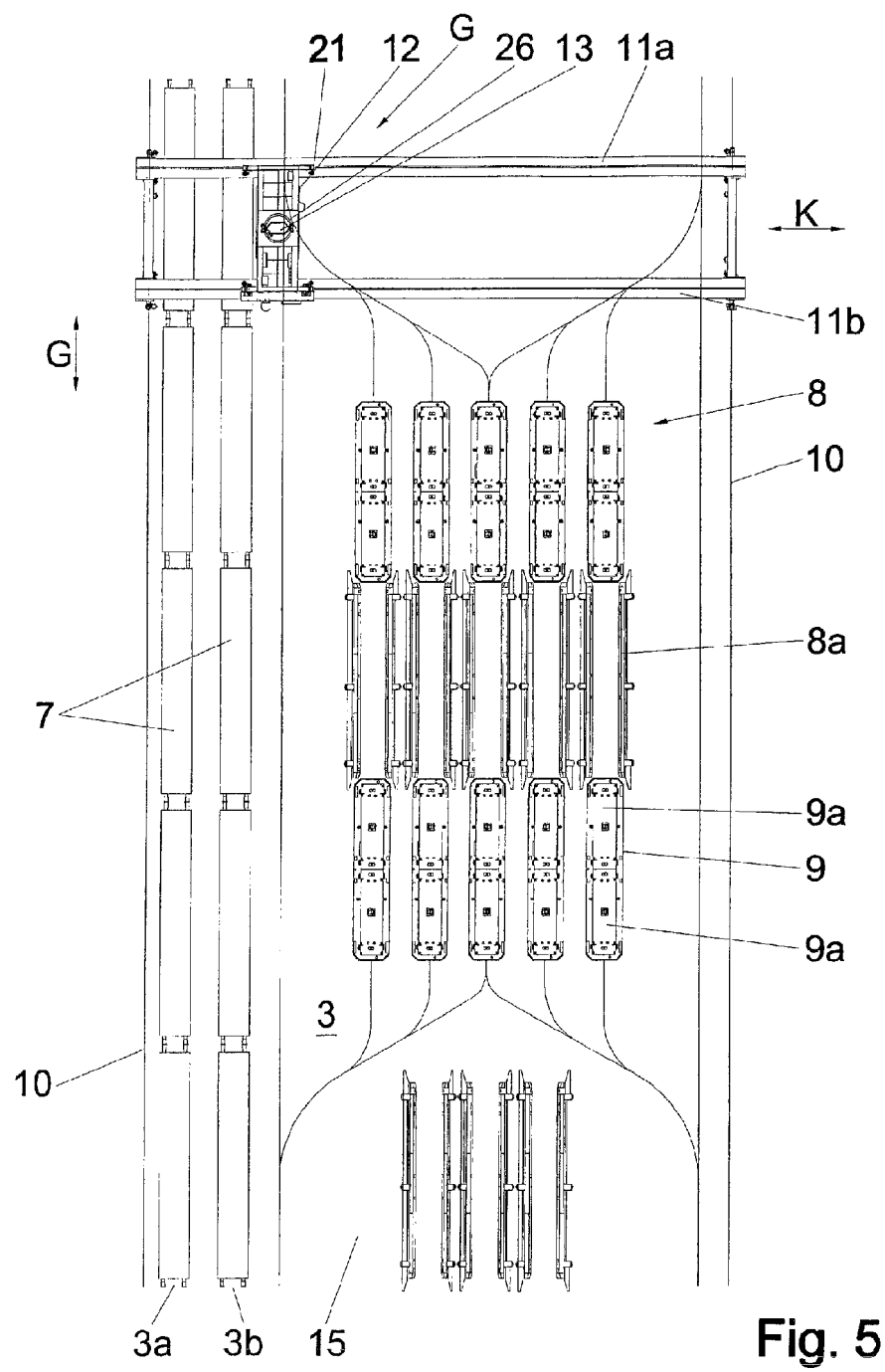
FIG. 5 is an enlarged sectional view of another alternative rail transfer zone similar to that of FIG. 2.

In FIG. 5 is shown another alternative embodiment of the rail transfer zone 3, which is similar to the embodiment described earlier with reference to FIG. 4.

The driverless transport vehicles 9 move here also in a driving zone located between the rails 11 and the tracks 3a, 3b. However, the configuration with a rotating tube 26 and a revolving joint 26a on the handling equipment 6 is not needed, as the supporting frames 8a for the interim storage and the standard cargo holders 2 are oriented centrally in the driving zone and parallel to the tracks 3a, 3b.

Figure 6:
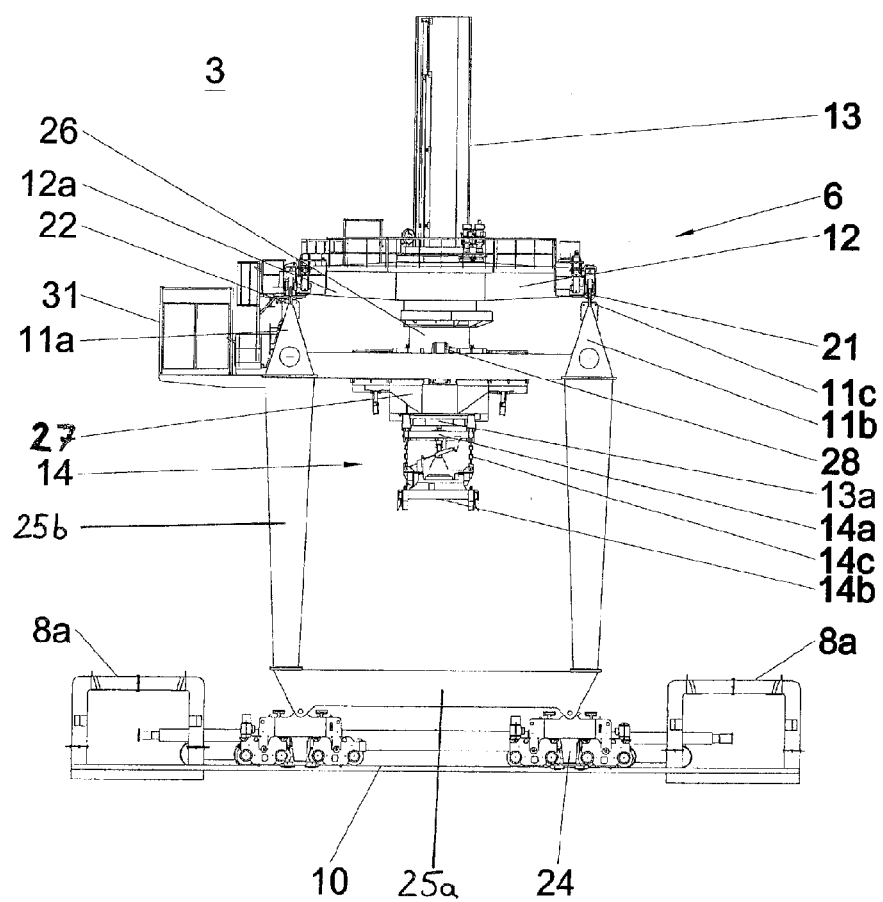
FIG. 6 is a side elevation of handling equipment of a transfer system, in an alternative embodiment.

FIG. 6 further shows that the load take-up device 14 is divided into a suspension frame 14a, which is rigidly mounted to the lower end 13a of the mast 13, and a spreader frame 14b, which is suspended on the suspension frame 14 via chains 14c. A container-like receptacle 31 is attached to the outside of the first girder 11a, in which the control and power electrics, or electronics for the handling equipment 6 are arranged.

FIG. 6 further shows that the load take-up device 14 is divided into a suspension frame 14a, which is rigidly mounted to the lower end 13a of the mast 13, and a spreader frame 14b, which is suspended on the suspension frame 14 via chains 14c. A container-like receptacle 31 is attached to the outside of the second girder 11b, in which the control and power electrics, or electronics for the handling equipment 6 are arranged.

Between the first and the second tracks 3a and 3b, which are running straight within the transfer zone 3, a variety of catenary supports can usually be located, which carry a catenary wire each above the first and second tracks 3a, 3b. The handling equipment 6 will then have a laterally cantilevered load take-up device 14.

The overview plan of FIG. 7 shows substantially all essential elements of the transfer system of FIG. 1, such as the rail transfer zone 3, the first and second tracks 3a, 3b, the cargo holder storage site 5, the handling equipment 6, the transfer zone 8, the supporting frames 8a, the driverless transport vehicles 9, the loading and unloading zones 16, and the stacking devices 17.

A variety of cargo holder storage sites 5, arranged side by side in parallel, is also shown. Compared to FIG. 1, the road transfer zone 4 is shown in more detail in FIG. 7. At the road-side end 5b of the cargo holder storage site 5, the standard cargo holders 2 are placed in the storage and retrieval zone 18 by the stacking device 17 onto the trucks 20, parked on the parking sites 18a located there, or are retrieved from there. The storage and retrieval zone 18 is the interface to the road transfer zone 4 and has several parking sites 18a for trucks 20, arranged side by side.

In addition, a distribution site 32 is located adjacent to the many cargo holder storage sites 5, which has loading and unloading zones 16 for the driverless transport vehicles 9 pointing to the rail transfer zone 3. As for the cargo holder storage sites 5, the loading and unloading zones 16 are equipped with supporting frames 16a for interim storage of the cargo holders 2. Additionally, the distribution site 32 is equipped with storage and retrieval sites 18, which are pointing to the road transfer site 4 with the street 4a for inward and outward transport of the cargo holders 2 via trucks 20. The storage and retrieval zones 18 have parking sites 18a, arranged side by side in parallel, for the trucks 20 backing up into these parking sites 18a.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A system for transferring standard cargo holders between rail and road, the system comprising:
    a rail transfer zone having a railway track and rail cars moving on said railway track to transport standard cargo holders;
    handling equipment for loading and unloading the standard cargo holders onto or off of the rail cars in said rail transfer zone to a transfer zone adjacent to said railway track, the handling equipment being a gantry crane comprising:
    a crane girder;
    a crane trolley movable along the crane girder in a trolley track direction;
    a rigid mast guided on the crane trolley, the mast having a lower end portion and extending in a lifting and lowering direction;
    at least one lifting gear comprising motor-rotated cable drums and cables associated therewith, the lifting gear attached to the crane trolley, and the cables configured to move the mast in the lifting and lowering direction; and
    a load take-up device for the standard cargo holders attached at a lower end portion of the mast;
    a driving zone having driverless transport vehicles bringing or picking up the standard cargo holders to or from the handling equipment, the driving zone located adjacent to the handling equipment; a loading and unloading zone for inward or outward transport of the standard cargo holders, the loading and unloading zone located adjacent to the driving zone;
    a cargo holder storage site adjacent to the loading and unloading zone with a stacking device comprising a gantry crane for transporting the standard cargo holders between the loading and unloading zone and the cargo holder storage site; and
    a road transfer zone for loading the standard cargo holders onto trucks and unloading the standard cargo holders off of trucks, the road transfer zone adjoining the cargo holder storage site, wherein the driverless transport vehicles are each equipped with a lifting platform, and wherein supporting frames are positioned in the loading and unloading zone, for placing onto or picking up the standard cargo holders from the supporting frames with the lifting platform of the driverless transport vehicles.

2. The system according to claim 1, wherein the handling equipment or the stacking device is configured to rotate the transported standard cargo holders about a vertical axis.

3. The system according to claim 1, wherein the load take-up device is laterally offset from the mast.

4. The system according to claim 1, wherein the crane girder comprises a first girder, a second girder, and trolley tracks located on the first and second girder, wherein the crane trolley can be moved in the trolley track direction and in which the first girder and the second girder are spaced from each other in the crane traveling direction, which runs at a right angle to the trolley track direction.

5. The system according to claim 1, wherein the mast is rotatable around a vertical axis in relation to the crane trolley.

6. A system for transferring standard cargo holders between rail and road, the system comprising:
   a rail transfer zone having a railway track and rail cars moving on said railway track to transport standard cargo holders;
   handling equipment for loading and unloading the standard cargo holders onto or off of the rail cars in said rail transfer zone to a transfer zone adjacent to said railway track, the handling equipment being a gantry crane comprising:
   a crane girder;
   a crane trolley movable along the crane girder in a trolley track direction;
   a rigid mast guided on the crane trolley, the mast having a lower end portion and extending in a lifting and lowering direction;
   at least one lifting gear comprising motor-rotated cable drums and cables associated therewith, the lifting gear attached to the crane trolley, and the cables configured to move the mast in the lifting and lowering direction; and
   a load take-up device for the standard cargo holders attached at a lower end portion of the mast;
   a driving zone having driverless transport vehicles bringing or picking up the standard cargo holders to or from the handling equipment, the driving zone located adjacent to the handling equipment; a loading and unloading zone for inward or outward transport of the standard cargo holders, the loading and unloading zone located adjacent to the driving zone;
   a cargo holder storage site adjacent to the loading and unloading zone with a stacking device comprising a gantry crane for transporting the standard cargo holders between the loading and unloading zone and the cargo holder storage site; and
   a road transfer zone for loading the standard cargo holders onto trucks and unloading the standard cargo holders off of trucks, the road transfer zone adjoining the cargo holder storage site, wherein the driverless transport vehicles are each equipped with a lifting platform, the driverless transport vehicles being positionable in the loading and unloading zone in a same orientation as said stacking device to facilitate placing the standard cargo holders onto the lifting platforms of the driverless transport vehicles and picking up the standard cargo holders from the lifting platforms of the driverless transport vehicles.

7. The system according to claim 6, wherein the load take-up device is laterally offset from the mast.

8. The system according to claim 7, wherein the crane girder comprises a first girder, a second girder, and trolley tracks located on the first and second girder, wherein the crane trolley can be moved in the trolley track direction and in which the first girder and the second girder are spaced from each other in the crane traveling direction, which runs at a right angle to the trolley track direction.

9. The system according to claim 6, wherein the handling equipment or the stacking device is configured to rotate the transported standard cargo holders about a vertical axis.

10. The system according to claim 6, wherein the crane girder comprises a first girder, a second girder, and trolley tracks located on the first and second girder, wherein the crane trolley can be moved in the trolley track direction and in which the first girder and the second girder are spaced from each other in the crane traveling direction, which runs at a right angle to the trolley track direction.

11. The system according to claim 6 wherein said stacking device includes another crane trolley that is movable along another crane girder in another trolley track direction and another rigid mast that is guided on said another crane trolley, wherein said another mast extends in the lifting and lowering direction.

12. The system according to claim 11 wherein said another mast is movable in the lifting and lowering direction by at least one other lifting gear attached to the another crane trolley, and wherein another load take-up device for the standard cargo holders is attached at a lower end of said another mast.

13. The system according to claim 12 wherein the another load take-up device is laterally offset from the another mast.

* * * * *